Patented June 24, 1930

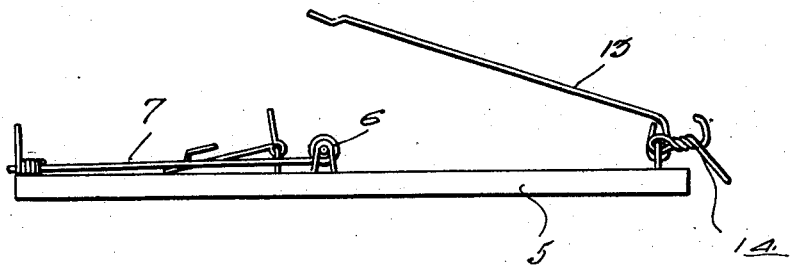
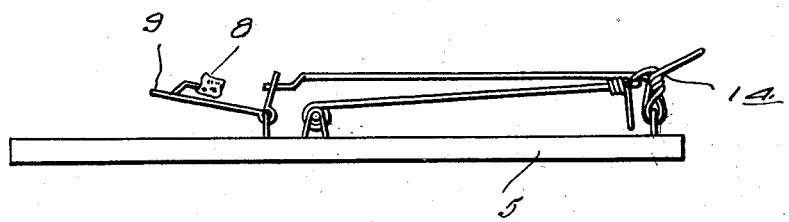
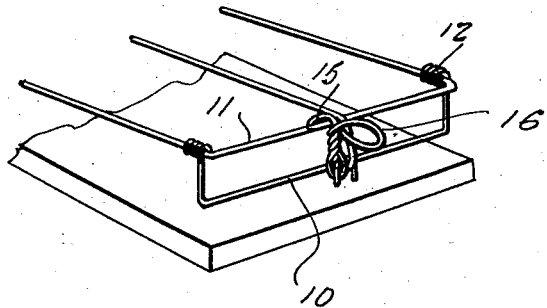

1,767,306

UNITED STATES PATENT OFFICE

HERBERT WILLIAM NORMAN, OF LODI, NEW JERSEY

MOUSETRAP

Application filed July 17, 1928. Serial No. 293,360.

The present invention relates to animal traps and more particularly to mouse or rat traps and has for its principal object to provide a device of this character having a striker bar arranged, upon being released, to strike the animal and deliver a death blow and to provide a handle for the striker bar whereby to enable the bar to be gripped for removing the animal from beneath the same without requiring the person's hand to come into contact with the animal. A still further object is to provide a safety hook for securing the striker bar against accidental release while setting the trap. A further object is to provide a device of this character which is simple and practical in construction, efficient and reliable in performance, relatively inexpensive to manufacture and otherwise well adapted for the purposes for which the same is intended. Other objects and advantages reside in the special construction, combination and arrangement of the various elements forming the invention as more fully hereinafter described and claimed, reference being had to the accompanying drawing forming part hereof, wherein like numerals refer to like parts throughout the specification and in which Figure 1 is a side elevational view showing the striker bar in released position, Figure 2 is a similar view showing the striker bar engaged by the safety hook for setting the trap, and Figure 3 is a fragmentary perspective view of the end of the trap provided with the safety hook and showing the same engaging the striker bar.

Referring now to the drawing in detail, wherein for the purpose of illustration I have disclosed a preferred embodiment of the invention, the numeral 5 designates a base for the trap upon which intermediate its ends is arranged a coil spring 6 to which is attached the ends of a U-shaped striker bar 7, the spring operating to force the striker bar downwardly upon one end of the base so as to deliver a blow upon the animal which may be lured to the trap by the bait 8 arranged on the bait holder 9 adjacent such end of the base. At the outer end of the striker bar is arranged a handle 10 formed of a single strand of wire having its intermediate portion disposed in spaced parallel relation above the end portion 11 of the striker bar and with the ends of the holder twisted about the opposite sides of the striker bar as shown at 12. Thus the striker bar may be raised so as to permit a removal of the animal without necessitating a persons hands coming into contact with the animal in order to remove the same from under the striker bar. At the opposite end of the base is arranged a rod 13 for releasably retaining the striker bar when the trap is set in a manner well known in the art and adjacent the attached end of said rod is a safety hook 14 secured to the upper portion of the base and formed of a twisted strand of wire having one end constructed in the form of a hook 15 for engaging the striker bar and securing the same while setting the trap and having its other end formed into a handle 16 extending in a direction opposite from the hook. Thus the hook may be used to retain the striker bar against accidental release during the setting of the rod 13. After the trap is set by the rod 13 the hook 14 is then released and the trap is ready for operation.

It is obvious that the invention is susceptible of various changes and modifications without departing from the spirit thereof or the scope of the appended claim, and I accordingly claim as my own all such forms of the invention to which I am entitled.

I claim:

An animal trap comprising a base having a U-shaped striker bar pivotally mounted thereon and a U-shaped handle for the free end of the striker bar having its ends secured at the opposite side edges of the bar and with the intermediate portions of the striker bar and the handle disposed in spaced parallel relation whereby to position the handle above the bar when the bar is in sprung position.

In testimony whereof I affix my signature.

HERBERT WILLIAM NORMAN.